United States Patent

Tava

(10) Patent No.: US 9,188,455 B2
(45) Date of Patent: Nov. 17, 2015

(54) NAVIGATION SYSTEM AND METHOD FOR COMPUTING THE OVERALL COSTS OF A ROUTE

(71) Applicant: Bayerische Motoren Werke Aktiengesellschaft, Munich (DE)

(72) Inventor: Marcello Tava, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 227 days.

(21) Appl. No.: 13/790,841

(22) Filed: Mar. 8, 2013

(65) Prior Publication Data

US 2013/0191025 A1   Jul. 25, 2013

Related U.S. Application Data

(63) Continuation of application No. PCT/EP2011/065387, filed on Sep. 6, 2011.

(30) Foreign Application Priority Data

Sep. 10, 2010   (DE) .......................... 10 2010 040 587

(51) Int. Cl.
    *G01C 21/34*   (2006.01)
(52) U.S. Cl.
    CPC ........ *G01C 21/3484* (2013.01); *G01C 21/3453* (2013.01)
(58) Field of Classification Search
    CPC .... G01C 21/26; G01C 21/3446; G01C 21/32; G01C 21/36; G01C 21/3484; G01C 21/3453; G08G 1/096827
    USPC ......... 701/410, 468, 532, 454, 533, 428, 420, 701/425, 209, 202, 208; 340/995.1, 995.23, 340/988, 990
    See application file for complete search history.

(56) References Cited

U.S. PATENT DOCUMENTS

| 5,905,451 A | 5/1999 | Sakashita |
| 6,014,607 A * | 1/2000 | Yagyu et al. .................. 701/533 |

(Continued)

FOREIGN PATENT DOCUMENTS

| DE | 197 16 354 A1 | 10/1997 |
| DE | 100 04 163 A1 | 8/2001 |

(Continued)

OTHER PUBLICATIONS

R. Agrawal and V.H. Jagadish; Algorithms for searching massive graphs; ICDE; 1994.*

(Continued)

*Primary Examiner* — James Trammell
*Assistant Examiner* — James E Stroud
(74) *Attorney, Agent, or Firm* — Crowell & Moring LLP

(57) ABSTRACT

A navigation system has an interface for accessing a memory unit, in which an electronic road map is stored with a large number of road sections, each of which has at least one first cost element assigned thereto, and has a computer unit, which is designed such that at least one second cost element is assigned or will be assigned to at least some of the road sections. In order to compute a route, a cost value is assigned or will be assigned to each of the road sections, wherein the computation of the cost value for the first road sections is based in each case on the first and the second cost element and for the second road sections is based in each case on the first and not on the second cost elements.

16 Claims, 2 Drawing Sheets

(56) References Cited

U.S. PATENT DOCUMENTS

| | | | |
|---|---|---|---|
| 6,141,552 A * | 10/2000 | Sendonaris et al. | 455/436 |
| 6,256,579 B1 * | 7/2001 | Tanimoto | 701/533 |
| 7,437,240 B2 | 10/2008 | Oumi et al. | |
| 7,957,894 B2 * | 6/2011 | Wellmann | 701/428 |
| 8,150,620 B2 * | 4/2012 | Motoyama | 701/410 |
| 2006/0069501 A1 | 3/2006 | Jung et al. | |
| 2008/0094250 A1 * | 4/2008 | Myr | 340/909 |
| 2012/0158301 A1 * | 6/2012 | Schilling et al. | 701/533 |
| 2012/0283948 A1 * | 11/2012 | Demiryurek et al. | 701/533 |

FOREIGN PATENT DOCUMENTS

| | | |
|---|---|---|
| DE | 102 42 125 A1 | 3/2004 |
| DE | 10 2006 030 271 A1 | 1/2007 |
| DE | 10 2008 042 748 A1 | 4/2010 |

OTHER PUBLICATIONS

Gernot Veit Batz and Daniel Delling and Peter Sanders and Christian Vetter; Time-Dependent Contraction Hierarchies; ALNEX; 1994.*
Adrijiana Car and Andrew U. Frank; Modeling a Hierarchy of Space applied to Large Road Networks; IGIS; 1994.*
L. Cooke and E. Halsey; The Shortest Route Through a Network with Time-Dependent Internodal Transit Times; Journal of Mathmatical Analysis and Applications; N.J. USA; 1966.*
Dean, Brain C.; Algorithms for Min-Cost Paths in Time-Dependent Networks With Wait Policies; Networks; N.J. USA; 2004.*
Dehne, Frank and Omran, Masoud T. and Sack, Jorg-Rudiger; Shortest Paths in Time-Dependent FIFO Networks Using Edge Load Forecasts; IWCTS; 2009.*
DanielDelling; Time-Dependent SHARC-Routing; ESA; 2008.*
Daniel Delling and Dorothen Wagner; Landmark-Based Routing in Dynamic Graphs; WEA; 2007.*
Ugur Demiryurek and Famoush Banaei Kashani and Cyrus Shahabi; A Case for Time-Depedent Shortest Path Computation in Spatial Networks; ACM SIGSPATIAL; Sep. 2010.*
Ugur Demiryurek and Famoush Banaei Kashani and Cyrus Shahabi; Efficient K-Nearest Neighbor Search in Time-Dependent Spatial Networks; DEXA; Aug. 2010.*
Stuart E. Dreylius; An Appraisal of Some Shortest-Path Algorithms; Operations Research vol. 17, No. 3, 1969.*
Baris Gue and Anand Ranganathen; Real-Time Scalable Route Planning using Stream-Processing Infrastructure; ITS; N.J. USA; 2010.*
Hart, Peter and Nilsson, Nils and Raphael, Bertram; A Formal Basis for The Heuristic Determination of Minimum Cost Paths; IEEE Transactions on systems Science and Cybernetics; 1968.*
Ekkchard Kohler and Katharina Langkau and Martin Skutella; Time-Expanded Graphs for Flow-Dependent Transit Times; Proc. 10th Annual European Symposium on Algorithms; 2002.*
NAVTEQ The Leading Map Provider; Http://www.navteq.com; accesed May 2010.*
Ira Pohl; Bi-Directional Search and Heuristic Search in Path Problems; Machine Intelligence; Edinburgh University Press; 1971.*
Potamias, Michalis and Bonchi, Francesco and Castillo, Carlos and Gionis, Aristides; Fast Shortest Path Distance Estimation in Large Networks; CIKM; 2009.*
Hanan Samet and Jagan Sankaranarayanan and Houman Alborzi; Scalable Network Distance Browsing in Spatial Databases; SIGMOD; pp. 3-40; Toranto, Canada; 2008.*
P. Sandersand D. Schultes; Highway Hierarchies Hasten Exact Shortest Path Queries; ESA; 2005.*
Sanders, Peter and Schultes, Dominik; Engineering Fast Route Planning Algorithms; WEA; 2007.*
Tele Atlas Map Insight; Http://licensing.tomtom.com/ForConsumers/MapFeedback/index.html; Accessed in May 2, 2011.*
Varaiya, Parvin; "What We've Learned about Highway Congestion"; Access; No. 27 Fall 2005; pp. 1-8.*
Wagner, Dorothea and Wilhaim, Thomas; Geometric Speed-Up Techniques for Finding Shortest Paths in Large Sparse Graphs; ESA; 2003.*
Antonin Guttman; R-Trees: A Dynamic Index Structure for Spatial Searching; Proceedings of SIGMOD; pp. 47-57; Boston, MA; 1984.*
Cho, Hyung-Ju and Chung, Chin-Wan; An Efficent and Scalable Approach to CNN Queries in a Road Network; Proceedings of VLDB, pp. 865-876; Trondheim Norway, 2005.*
Demiryurek et al; "Towards K-Nearest Neighbor Search in Time Dependent Spatial Network Databases"; 2010; proceedings of DNIS, 2010.*
Dimitris Papadias and Jun Zhang and and Nikos Mamoulis and Yufei Tao; Query Processing in Spatial Network Databases; Proceedings of VLDB, pp. 802-813, Berlin, Germany, 2003.*
Ding, Bolin and Yu, Jeffrey Xu and Qin, Lu; Finding Time-Dependent Shortest Paths Over Large Graphs; Proceedings of EDBT, New York, NY, USA, 2008. ACM.*
Andrew V. Goldberg and Chris Harellson; Computing the Shortest Path: A Search Meets Graph Theory; SODA; pp. 422-432; 2005.*
George, Betsy and Kim, Sangho and Shekhar, Shashi; Spatio-Temporal Network Databases and Routing Algorithms: A Summary of Results; Proceedings of SSTD, 2007.*
Haibo Hu and Dik Lun Lee and Jianliang Xu; Fast Nearest Neighbor Search on Road Networks; Proceedings of EDBT, pp. 33-40, Toronto, Canada, 2006.*
Hanan Samet and Jagan Sankaranarayanan and Houman Alborzi; Scalable Network Distance Browsing in Spatial Databases; Proceedings of SIGMOD, pp. 33-40, Toronto, Canada, 2008.*
Huang, Xuegang and Jensen, Christian S. and Saltenis, Simonas; The Island Approach to Nearest Neighbor Querying in Spatial Networks; Proceedings of SSTD, pp. 33-40, Toronto, Canada, 2005.*
Ismail Chabini; Discrete Dynamic Shortest Path Problems in Transportation Applications Complexity and Algorithms With Optimal Run Time; Journal of Transportation Research Record, 1645, NJ, USA, 1997.*
J. Halpern; Shortest Route With Time Dependent Length of Edges and Limited Delay Possibilities in Nodes; Journal of Mathematical Methods of Operations Research, 21, 1969.*
Kanoulas, Evangelos and Du, Yang and Xia, Tian and Zhang, Donghui; Finding Fastest Paths on a Road Network with Speed Patterns; Proceedings of ICDE, Washington, USA, 2006.*
Ulrith Lauther; An Extremely Fast, Exact Algorithm for Finding Shortest Paths in Static Networks With Geographical Background; Geoinformation and Mobilitat, pp. 33-40, Toronto, Canada, 2004.*
Martin Erwig and Fernuniversitat Hagen; The Graph Voronoi Diagram with Applications; Journal of Networks, 36, 2000.*
Mohammad Kolandouzan and Cyrus Shahabi; Voronoi-Based K Nearest Neighbor Search for Spatial Network Databases; Proceedings of VLDB, pp. 840-851, Toronto, Canada, 2004.*
Orda, Ariel and Rom, Raphael; Shortest-Path and Minimum-Delay Algorithms in Networks With Time-Dependent Edge-Length; Journal of the ACM, 37, 1990.*
Ugur Demiryurek and Bei Pan and Farnoush Banaei Kashani and Cyrus Shahabi; Towards Modeling The Traffic Data on Road Networks; Proceedings of SIGSP A TIAL-IWCTS, 2009.*
English translation of International Preliminary Report on Patentability (PCT/IB/373 & PCT/ISA/237) dated Mar. 12, 2013 (six (6) pages).
German Search Report dated Apr. 12, 2011 w/ Partial English translation (nine (9) pages).
International Search Report dated Nov. 7, 2011 w/ English translation (six (6) pages).

* cited by examiner

NAVIGATION SYSTEM AND METHOD FOR COMPUTING THE OVERALL COSTS OF A ROUTE

CROSS REFERENCE TO RELATED APPLICATIONS

This application is a continuation of PCT International Application No. PCT/EP2011/065387, filed Sep. 6, 2011, which claims priority under 35 U.S.C. §119 from German Patent Application No. DE 10 2010 040 587.6, filed Sep. 10, 2010, the entire disclosures of which are herein expressly incorporated by reference.

BACKGROUND AND SUMMARY OF THE INVENTION

The invention relates to a navigation system and a method for computing the total costs of a route, for example, within the framework of determining a good or optimal route.

With navigation systems it is possible to compute, based on a digital road map, the routes between a starting point and a destination point in such a way that the routes are optimized according to different criteria. For this purpose it is proposed that individual digitized sections of the road be assigned cost values (for example, the travel time, the distance, the energy consumption, etc. or any combination based thereon) and to determine a route at a low or minimal total cost.

Routes that are determined automatically in such a fashion often deviate, especially at the starting point and the destination point, from the route that a user would have chosen or actually chooses due to his or her specific knowledge of the place.

At this point the object of the present invention is to provide an improved navigation system and method for computing the overall costs of a route.

This and other objects are achieved by a navigation system comprising an interface for accessing a memory unit, in which an electronic road map is stored with a large number of road sections, each of which is assigned at least one first cost element, and a computer unit, which is designed such that at least one second cost element is assigned or will be assigned to at least some of the road sections. In order to compute a route, a cost value is assigned or will be assigned to each of the road sections, wherein the computation of the cost value for the first road sections is based in each case on the first and the second cost element and for the second road sections is based in each case on the first and not on the second cost element.

A navigation system according to the present invention includes an interface for accessing a memory unit, in which an electronic road map is stored with a large number of road sections, each of which has at least one first cost element assigned thereto.

A computer unit, such as a program-controlled processor unit, is designed or configured in such a way that at least one second cost element can be assigned, is assigned, or will be assigned to at least some of the road sections. As used herein, the term "assigned" is to be interpreted as including "assignable," "assigned" or "to be assigned."

In order to compute a route, a cost value is assigned or will be assigned to each of the road sections. The computation (determination) of a cost value or a cost value for the first road sections is based in each case on the first and the second cost element. The computation (determination) of a cost value or a cost value for the second road sections is based in each case on the first and not on the second cost element, in particular, independent of whether a second cost value does or does not exist for the second road sections.

The result is that in order to compute a route, specific road sections, which are located, for example, in close proximity to the starting place or the destination place, can be assigned in a flexible and dynamic manner cost values that consider the second cost elements. These second cost elements allow, for example, personal driving habits of a user or the route preferences of a user to be taken into account. At the same time these second cost elements are preferably not stored as a part of the electronic road map, or preferably not stored on the same memory medium as the electronic road map. The present invention avoids having to consider the second cost elements for all sections of the road, because for long routes such a procedure would increase the computing time required to compute the route.

The term "road section" also includes a data object that describes a section of the road.

The first cost elements can be based, for example, on the travel time, the distance or the speed of a corresponding section of the road. In addition to the first cost elements and the second cost elements, it goes without saying that third or additional cost elements can be provided and can be considered.

Cost elements, in particular second cost elements, can also be negative. For example, whenever a section of the road is traveled, a negative value is assigned to that section of the road as the second cost element.

If a cost value is based only on a first cost element, then the cost value can be determined, for example, by means of the first cost element. If a cost value is based on a first and a second cost element, then the cost value can be determined, for example, by means of a sum of the first and second cost element.

Second cost elements can be stored or are stored in each case as a function of the starting place, as a function of the destination, as a function of the day of the week, as a function of the driver and/or as a function of the time of day; and/or the second cost elements can be used in each case as a function of the starting place, as a function of the destination, as a function of the day of the week, as a function of the driver and/or as a function of the time of day for computing the cost values.

The first memory unit can be, for example, an optical removable memory medium, a hard disk or a memory of a central server unit, which the navigation system can access by way of a mobile communications device.

A navigation system comprising a computer unit for computing the total costs of a route composed of sections of the road, wherein a first cost element and at least to some extent a second cost element are assigned to each of the road sections, is also within the scope of the invention.

The computer unit is configured in such a way that a cost value is assigned or will be assigned to each of the road sections, wherein the computation of the cost value for the first road sections is based in each case on a first and a second cost element; and the computation of the cost value for the second road sections is based in each case on the first and not on the second cost element. The total costs of the route are based on the cost values of the road sections that are an essential part of the route.

A method for computing the total costs of a route also falls within the scope of the invention. According to this method, a first cost element and at least to some extent a second cost element are assigned to each of the sections of the road defining the route; and a cost value is assigned or will be assigned to each of the road sections. In this case the computation of the cost value for the first road sections is based in each case on a first and a second cost element; and the computation of the cost value for the second road sections is based in each case on the first and not on the second cost element; and the total costs of the route are based on the cost values of the road sections that are an essential part of the route.

In a further aspect of the invention, the second cost elements are based on a usage history. Second cost elements describe, for example, when, by whom, how often, with which destination, with which starting place and/or how (how fast, with which average consumption) the associated road section was used or was traveled. Second cost elements can be determined and/or stored according to the specific motor vehicle, the specific motor vehicle manufacturer, the specific user and/or the specific motor vehicle model. For example, whenever the associated road section is traveled, a negative value can be added to a second cost element. In design variants the second cost elements can be, for example, determined and stored according to the specific destination and can be used for computing a route or for computing the total costs.

It is an additional further development of the invention that in particular on average the first road sections are located closer to the starting point of the route and/or closer to the destination point of the route than the second road sections.

The result of this arrangement is that second cost elements are considered precisely for the road sections that a user often drives, contrary to a route computed in the conventional way, because of his knowledge of the starting place or the destination place. For this reason the higher computational complexity associated with the consideration of second cost elements is implemented to take into account in a targeted way the usage patterns only or preferably for route sections, for which the user's request deviates with a high probability from a route that is computed in a conventional way.

It is a further development of the invention that the number of first road sections or the ratio of the number of first road sections to the number of second road sections is varied from route to route as a function of the utilization of the computer unit. If the current utilization of the computer unit is low, because, for example, the route is short, or if other processes, which are executed by the computer unit (for example, independently of the navigation), still require relatively little computing power, then the number of road sections having cost values that consider the second cost elements can be increased and/or vice versa.

Second cost elements change preferably over time as a function of the user's behavior. Therefore, cost values are recomputed preferably contemporaneously, in particular, before or during the computation of a route or the computation of the total costs, and are stored. If the corresponding second cost elements have not changed since the last computation of the cost value, then in order to compute a new route or new total costs, the cost value of the corresponding road section is preferably not recomputed, but rather the stored cost value is used. This approach allows the current user behavior to be considered continually and at the same time reduces the computational complexity.

In a further aspect of the invention, the second cost elements are stored or will be stored in a second memory unit. A second memory unit is, for example, a permanently installed component of the navigation system, of the vehicle or of the computer unit. In particular, the second memory unit is configured preferably independently of the memory unit for the electronic road map. This feature facilitates a user-specific or motor vehicle-specific storage and usage of second cost elements. However, it also falls within the scope of the invention that the first memory unit is identical to the second memory unit.

It is an additional further development of the invention that a route is computed, and for this route the sum of the cost values of the road sections defining the route is minimal.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
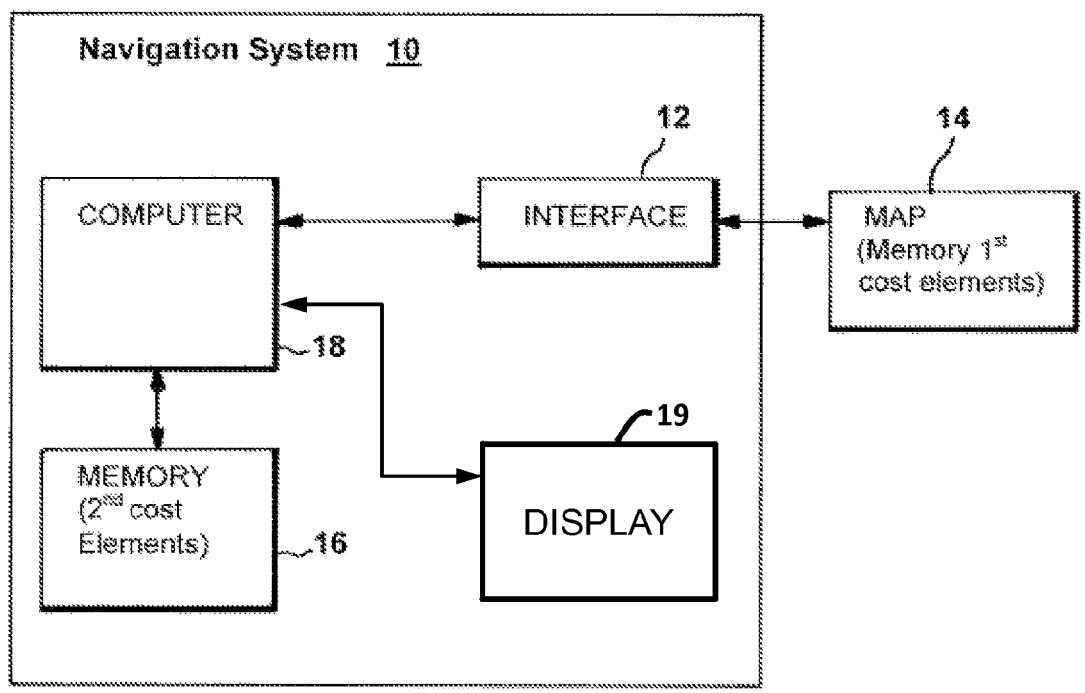
FIG. 1 is a simplified block diagram illustrating an exemplary navigation system according to the invention.

The starting point is a well-known navigation system. Referring to FIG. 1, the navigation system 10 has an interface 12 for accessing a first memory unit 14, in which an electronic road map is stored, and a display 19.

A second memory unit 16 is a part of the navigation system 10. Second cost elements, which are assigned to each section of the road, are stored in the second memory unit as a function of the usage of the navigation system or as a function of the usage of a motor vehicle, in which the navigation system is used.

A second cost element can be determined, for example using a computer unit 18, by how often the associated road section was traveled in the past. A second cost element can also be determined, for example, by how often the associated road section was traveled on the way to a specific destination. The more often the section of the road has been traveled, the less (or the more negative) the influence of the corresponding second cost element on a cost value, which is assigned or will be assigned to the associated section of the road, when the total costs of a route are computed or when a route is computed.

Depending on the design variant, the second cost element can be determined, for example, according to the specific destination, can be determined according to the specific starting place, can be determined according to the specific user, can be determined according to the specific day of the week and/or can be determined according to the specific time of day.

For example, when the second cost element is determined according to the specific destination, then a plurality of second cost elements are assigned to a road section and stored. For each destination, which was just set or chosen while travelling on a road section, there is a second cost element. In order to compute a cost value for a section of the road, the second cost element that corresponds to the destination chosen at that instant is then used automatically.

For example, the cost values of the road sections of a route are added up in accordance with the well-known computation of an optimal route (Dijkstra's algorithm; A* algorithm or bi-directional search) or the total costs of a route. For this purpose, the first cost elements of all road sections of the route are read out of the first memory unit and are used by the computer unit of the navigation system in the course of determining the cost values for the road sections.

According to the invention, second cost elements are read out of the second memory unit only for such road sections that are, for example, in a defined local relation to the starting point and/or the destination point of the route.

For example, second cost elements are read out of the second memory unit only for such road sections that are located inside a specified local area (for example, having a radius of 5 or 10 km) around the starting point and/or the destination point of the route. Only the second cost elements of these road sections are used by the computer unit of the navigation system in the course of determining the cost values for these road sections. The inclusion of the second cost elements reduces the cost value of a road section that is actually determined by means of the corresponding first cost element by, for example, subtracting a positive second cost element from the first cost element, by adding a negative second cost element to the first cost element, or by dividing the first cost element by a second cost element.

Figure 2:
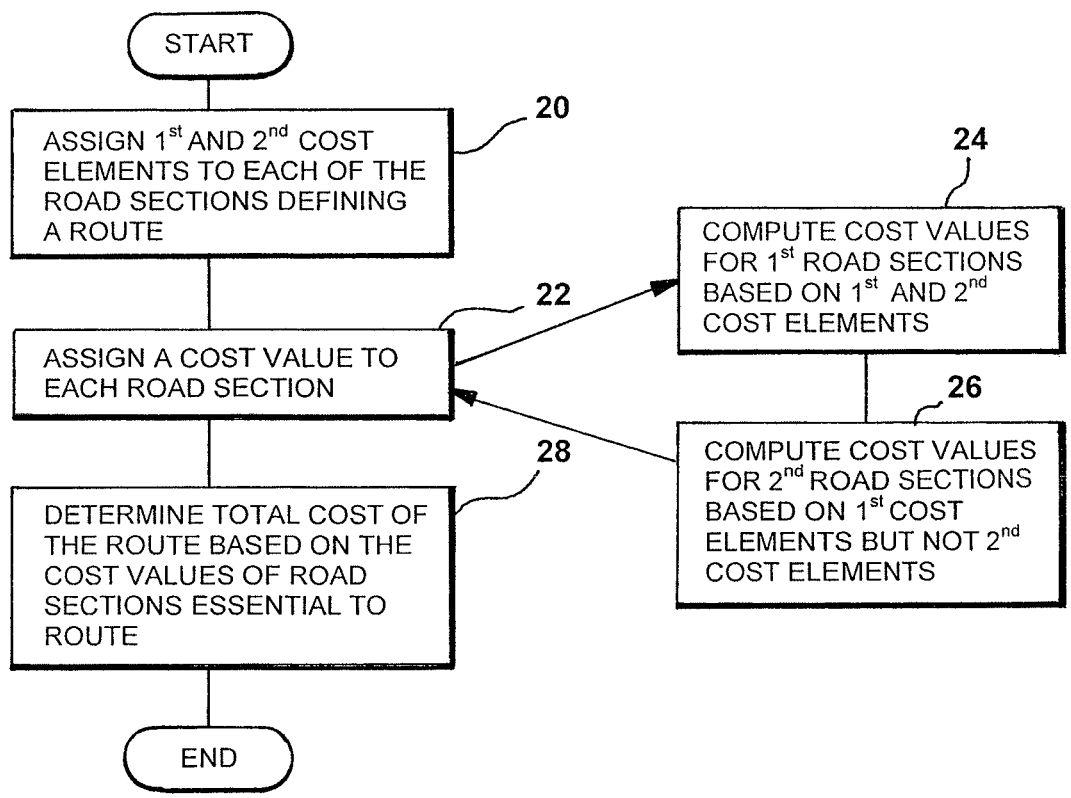
FIG. 2 is a simplified flow chart illustrating an exemplary method for computing total costs of a route in accordance with the present invention.

Referring to FIG. 2, a method for computing the total costs of a route starts by assigning a first cost element and at least to some extent a second cost element to each of the sections of the road defining the route (step 20). Then, a cost value is assigned or will be assigned to each of the road sections (step 22). In order to assign the cost values, a computation is made of the cost value for first road sections based, in each case, on a first and a second cost element (step 24). Further, a cost value for second road sections is computed based, in each case, on the first cost element but not the second cost element (step 26). The method then determines the total costs of the route based on the cost values of those road sections that are an essential part of the route (step 28).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation system, comprising:
   a display;
   an interface operatively configured to access a first memory unit in which an electronic road map is stored, the road map having a large number of road sections, each of which is assigned at least one first cost element; and
   a computer unit operatively configured to assign to at least some of the road sections at least one second cost element;
   wherein the computer unit is further operatively configured to assign a cost value in order to compute a route to be displayed on the display, a computation of the cost value for first road sections being based in each case on the first and the second cost element, and the computation of the cost value for second road sections being based, in each case, on the first cost element and not on the second cost element, wherein the second cost elements are based on a navigation usage history, and wherein further the first road sections comprise road sections located closer to either a starting point or a destination point of the route than the second road sections, and wherein a number of first road sections or a ratio of the first road section to a number of second road sections varies as a function of utilization of the computer unit of the navigation system.

2. The navigation system according to claim 1, wherein the second cost elements are at least one of determined and stored in accordance with one of:
   a specific motor vehicle, a specific motor vehicle manufacturer, a specific user of the motor vehicle, and a specific motor vehicle model.

3. The navigation system according to claim 1, wherein the cost values are computed during computation of the route, the cost values being stored in the navigation system.

4. The navigation system according to claim 1, further comprising a second memory unit in which the second cost elements are to be stored.

5. The navigation system according to claim 3, further comprising a second memory unit in which the second cost elements are to be stored.

6. The navigation system according to claim 1, wherein the navigation system computes the route based on determining a sum of the cost values of the road sections defining the route which is minimal.

7. A navigation system comprising:
   a display; and
   a computer unit operatively configured to compute total costs of a route to be displayed on the display, wherein:
      a first cost element and, at least to a certain extent, a second cost element are assigned to each section of a road defining the route,
      a cost value is assigned to each of the road sections, a computation of the cost value for first road sections being based, in each case, on a first cost element and a second cost element and a computation of the cost value for second road sections being based, in each case, on the first cost element and not the second cost element, and
      a total cost of the route is based on the cost values of the road sections that are an essential part of the route, wherein the second cost element is based on a navigation usage history, and wherein further the first road sections comprise road sections located closer to either a starting point or a destination point of the route than the second road sections, and wherein a number of first road sections or a ratio of first road sections to a number of second road sections varies as a function of utilization of the navigation system.

8. A method of operating a navigation system to compute a total cost of a route to be traveled, the method comprising the acts of:
   assigning a first cost element and, at least to a certain extent, a second cost element to each of road sections defining the route;
   assigning a cost value to each of the road sections defining the route, wherein a computation of the cost value for first road sections is based, in each case, on both first and second cost elements for the respective first road sections, and a computation of the cost value for second road sections is based, in each case, on the first cost element but not on the second cost element for the respective second road sections;
   determining the total costs of the route based on the assigned cost values of those road sections comprising an essential part of the route to be traveled, wherein the second cost elements are based on a navigation usage history, and wherein further the first road sections comprise road sections located closer to either a starting point or a destination point of the route than the second road section, and wherein a number of first road sections or a ratio of first road sections to a number of second road sections varies as a function of utilization of the navigation system; and
   displaying the route on a display of the navigation system.

9. The navigation system according to claim 7, wherein the second cost element is at least one of determined and stored in accordance with one of:

a specific motor vehicle, a specific motor vehicle manufacturer, a specific user of the motor vehicle, and a specific motor vehicle model.

10. The method according to claim 8, wherein the second cost element is at least one of determined and stored in accordance with one of:
a specific motor vehicle, a specific motor vehicle manufacturer, a specific user of the motor vehicle, and a specific motor vehicle model.

11. The navigation system according to claim 1, wherein the first road sections are in proximity to either the starting point or the destination point of the route.

12. The navigation system according to claim 7, wherein the first road sections are in proximity to either the starting point or the destination point of the route.

13. The method according to claim 8, wherein the first road sections are in proximity to either the starting point or the destination point of the route.

14. The navigation system according to claim 1, wherein the navigation usage history describes at least one of when, by whom, how often, with which destination and with which starting place an associated road section was traveled.

15. The navigation system according to claim 7, wherein the navigation usage history describes at least one of when, by whom, how often, with which destination and with which starting place an associated road section was traveled.

16. The method according to claim 8, wherein the navigation usage history describes at least one of when, by whom, how often, with which destination and with which starting place an associated road section was traveled.

* * * * *